United States Patent
Shimizu et al.

(10) Patent No.: US 7,029,607 B2
(45) Date of Patent: *Apr. 18, 2006

(54) PROCESS FOR PRODUCING POLYMER OPTICAL WAVEGUIDE

(75) Inventors: Keishi Shimizu, Ashigarakami-gun (JP); Shigemi Ohtsu, Ashigarakami-gun (JP); Kazutoshi Yatsuda, Ashigarakami-gun (JP); Eiichi Akutsu, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 258 days.

This patent is subject to a terminal disclaimer.

(21) Appl. No.: 10/389,915

(22) Filed: Mar. 18, 2003

(65) Prior Publication Data
US 2004/0057683 A1    Mar. 25, 2004

(30) Foreign Application Priority Data
Sep. 20, 2002 (JP) .............................. 2002-276028

(51) Int. Cl.
*B29D 11/00* (2006.01)
(52) U.S. Cl. .............. 264/1.25; 264/1.38; 264/1.7; 264/2.5
(58) Field of Classification Search ............... 264/1.1, 264/1.25, 1.7, 2.5, 1.36, 1.38; 385/129, 130, 385/132
See application file for complete search history.

(56) References Cited

U.S. PATENT DOCUMENTS

| | | | |
|---|---|---|---|
| 4,884,434 A * | 12/1989 | Satake et al. ................ 73/7 |
| 5,716,556 A | 2/1998 | Heard | |
| 5,949,945 A * | 9/1999 | Okano et al. ............... 385/132 |
| 6,314,228 B1 * | 11/2001 | Korenaga et al. ........... 385/129 |
| 6,355,198 B1 | 3/2002 | Kim et al. | |
| 6,504,966 B1 | 1/2003 | Kato et al. | |
| 6,504,996 B1 | 1/2003 | Na et al. | |
| 6,901,198 B1 * | 5/2005 | Shimizu et al. ............. 385/129 |

FOREIGN PATENT DOCUMENTS

| | | |
|---|---|---|
| JP | B2 3151364 | 1/2001 |
| JP | A 2002-90565 | 3/2002 |

OTHER PUBLICATIONS

Xia et al., "Soft Lithography", Annu. Rev. Mater. Sci., pp. 153-184, 1998.
Whitesides et al., "The art of building small", Scientific American, pp. 39-47, 2001.

* cited by examiner

*Primary Examiner*—Mathieu D. Vargot
(74) *Attorney, Agent, or Firm*—Oliff & Berridge, PLC

(57) ABSTRACT

A process for producing a polymer optical waveguide, including the steps of: preparing a mold;

bringing into close contact with a cladding substrate which has good adhesiveness to the mold;

introducing, by capillarity, a curable resin; and curing the introduced curable resin,
wherein one through hole or multiple through holes arranged at regular intervals in a longitudinal direction of the core portion are opened to form the one or more resin input ports or one or more resin output ports in order for both the cut ends to be used as resin output portions; and after the curable resin is introduced into the concave portion, a resin pushing member is inserted into each of the one or more resin input ports and/or the one or more resin output ports, to thereby perform the step of introducing the curable resin into the concave portion of the mold by capillarity.

18 Claims, 6 Drawing Sheets

PROCESS FOR PRODUCING POLYMER OPTICAL WAVEGUIDE

BACKGROUND OF THE INVENTION

1. Field of the Invention

The present invention relates to a process for producing an optical waveguide, in particular, a flexible polymer optical waveguide, at low costs.

2. Description of the Related Art

As the process for producing a polymer optical waveguide, the following processes are proposed: (1) a process of impregnating a film with a monomer, exposing a core portion selectively to light to change the refraction index thereof, and sticking a film thereto (selective polymerization); (2) a process of applying a core layer and a clad layer, and forming a clad portion by reactive ion etching (RIE); (3) a process employing photolithography to perform exposure and development (direct exposure) using an UV-curable resin obtained by adding a photosensitive material to a polymeric material; (4) a process employing injection molding; (5) a process of applying a core layer and a clad layer, and exposing a core portion to light to change the refraction index of the core portion (photo bleaching), or the like processes.

However, the selective polymerization process (1) has a problem of sticking of the film, and the processes (2) and (3) involve increased costs since photolithography is used. The process (4) has a problem of poor precision of the resultant core diameter, and the process (5) has a problem of an insufficient refraction index difference. Currently, practically used processes having superior performance are only the processes (2) and (3). Any of the processes (1) to (5) cannot be applied to the formation of a polymer optical waveguide on a large-area and flexible plastic substrate.

As the process for producing a polymer optical waveguide, there is known a process of filling a pattern substrate (clad) having patterned grooves to form capillaries, a polymer precursor material for a core, curing the precursor material to form a core layer, and then adhering a flat substrate (clad) onto the core layer. However, this process has a problem in that the polymer precursor material is thinly supplied to not only the capillarity groove but also the entire space between the pattern substrate and the flat substrate and then cured to form a thin layer having the same composition as the core layer, so that light leaks out through this thin layer.

As one of the methods of solving this problem, Davit Heard proposed a method of fixing and sticking a pattern substrate having patterned grooves to form capillaries to a flat substrate using a clamping jig, sealing the contact portion between the pattern substrate and the flat substrate with a resin, and then reducing the internal pressure to fill the capillaries with a monomer (diallyl isophthalate) solution, thereby producing a polymer optical waveguide (Japanese Patent gazette No. 3151364).

However, this method has a problem in that due to its complicated procedure, in which the monomer solution penetrates the portions other than the core portion without using a clamping jig for adhering the plate, thereby failing to produce a precise waveguide structure and an additional problem in that the volume shrinkage occurs when the monomer is polymerized (cured) to form a polymer, thereby altering the shape of the core. Further, when capillaries are removed, the polymer produced from the monomer solution partly adheres to the capillarity, to thereby destroy the core shape.

Recently, George M. Whitesides et al. in Harvard University have proposed, as a method for forming a nanostructure, a method called capillarity micromold as a soft lithographic process. This method uses photolithography to form a master substrate, utilizing adhesiveness of polydimethylsiloxane (PDMS) and easily-peelability thereof to transfer the nanostructure of the master substrate onto a mold made of PDMS, pouring liquid polymer into this mold by capillarity, and curing the polymer. A detailed review thereof is described in SCIENTIFIC AMERICAN September 2001 (Nikkei Science, 2001, December).

Kim Enoch et al. of George M. Whitesides' group in Harvard University obtained a patent on the capillarity micromold method (U.S. Pat. No. 6,355,198).

However, even if the production process disclosed in this patent is applied to the production of a polymer optical waveguide, it takes much time to form its core portion since the sectional area of the core portion of the polymer optical waveguide is small, thus making the process unsuitable for mass production. This process also has a drawback that when a monomer solution is polymerized to form a polymer, a volume change occurs to alter the shape of the core, and consequently, the transmission loss (guided wave loss) becomes large.

The present inventors proposed a method of forming a polymer optical waveguide, which achieves precise core shapes, and remarkably suppressed transmission loss and insertion loss by utilizing capillarity phenomenon. This method, however, requires a prolonged time to fill a curable resin when the core portion (waveguide) is long and hence impairs productivity.

To solve the above problems, Sugiyama et al proposed a method utilizing a plurality of filling inlets (e.g., Japanese Patent Application Laid Open (JP-A) No. 2002-90565). This method has an advantage in that a branched ring-shape waveguide can be formed as it is, however it has a disadvantage in that plural branched filling inlets must be removed precisely, which inevitably leads to increased costs as well as guided wave loss.

SUMMARY OF THE INVENTION

The present invention has been made in light of the above-described problems and aims to achieve the following. That is, an object of the invention is to provide a process for producing a polymer optical waveguide that exhibits a reduced guided wave loss, in a simple manner and at low costs.

The above object is attained by the following invention. Specifically, the inventors have discovered a method that is capable of shortening the time for filling a curable resin in a process for producing, utilizing capillarity, a polymer optical waveguide that exhibits reduced guided wave loss and insertion loss while precisely keeping its core shape.

A first aspect of the invention is a process for producing a polymer optical waveguide, which comprises the steps of:

preparing a mold by applying a mold-forming elastomer layer onto a surface of a master template having formed thereon a convex portion that corresponds to a core portion, peeling the layer from the master template to obtain a template, and cutting both ends of the template to expose a concave portion that corresponds to the convex portion of the master template;

bringing into close contact with a surface having the concave portion of the mold a cladding substrate which has good adhesiveness to the mold;

introducing, by capillarity, a curable resin which forms the core into the concave portion of the mold by contacting the curable resin with one or more resin input ports; and curing the introduced curable resin, wherein one through hole or multiple through holes arranged at regular intervals in a longitudinal direction of the core portion are opened to communicate from another surface opposite to the surface of the mold that is brought into close contact with the cladding substrate to the concave portion, thereby forming the one or more resin input ports or one or more resin output ports in order for both the cut ends of the mold to be used as resin output portions; and after the curable resin is introduced into the concave portion, a resin pushing member is inserted into each of the one or more resin input ports and/or the one or more resin output ports to a depth obtained by subtracting a height of the convex portion from a thickness of the mold, to thereby perform the step of introducing the curable resin into the concave portion of the mold by capillarity.

A second aspect of the invention is a process for producing a polymer optical waveguide, which comprises the steps of:

preparing a mold by applying a mold-forming elastomer layer onto a surface of a master template having formed thereon a convex portion that corresponds to a core portion, peeling the layer from the master template to obtain a template, and cutting both ends of the template to expose a concave portion that corresponds to the convex portion of the master template;

bringing into close contact with a surface having the concave portion of the mold a cladding substrate which has good adhesiveness to the mold;

introducing, by capillarity, a curable resin which forms the core into the concave portion of the mold by contacting the curable resin with one or more resin input ports and/or resin input portions; and curing the introduced curable resin, wherein one through hole or multiple through holes arranged at regular intervals in a longitudinal direction of the core portion are opened to communicate from another surface opposite to the surface of the mold that is brought into close contact with the cladding substrate to the concave portion, thereby forming the one or more resin input ports or one or more resin output ports in order for both the cut ends of the mold to be used as resin input portions; and after the curable resin is introduced into the concave portion, a resin pushing member is inserted into each of the one or more resin input ports and/or the one or more resin output ports to a depth obtained by subtracting a height of the convex portion from a thickness of the mold, to thereby perform the step of introducing the curable resin into the concave portion of the mold by capillarity.

A third aspect of the invention is a process for producing a polymer optical waveguide, which comprises the steps of:

preparing a mold by applying a mold-forming elastomer layer onto a surface of a master template having formed thereon a convex portion that corresponds to a core portion, peeling the layer from the master template to obtain a template, and cutting both ends of the template to expose a concave portion that corresponds to the convex portion of the master template;

bringing into close contact with a surface having the concave portion of the mold a cladding substrate which has good adhesiveness to the mold;

introducing, by capillarity, a curable resin which forms the core into the concave portion of the mold by contacting the curable resin with one or more resin input ports; and curing the introduced curable resin, wherein one through hole or multiple through holes arranged at regular intervals in a longitudinal direction of the core portion are opened to communicate from another surface opposite to the surface of the mold that is brought into close contact with the cladding substrate to the concave portion, thereby forming the one or more resin input ports or one or more resin output ports in order for both the cut ends of the mold to be used as resin output portions; and after the curable resin is introduced into the concave portion, a resin pushing member, in which a refractive index of a portion from a tip thereof to a portion thereof corresponding to a height of the convex portion is equal to that of the curable resin and a refractive index of other portions of the member is lower than that of the curable resin, is inserted into each of the one or more resin input ports and/or the one or more resin output ports so that the tip thereof is brought into close contact with the cladding substrate, to thereby perform the step of introducing the curable resin into the concave portion of the mold by capillarity.

A fourth aspect of the invention is a process for producing a polymer optical waveguide, which comprises the steps of:

preparing a mold by applying a mold-forming elastomer layer onto a surface of a master template having formed thereon a convex portion that corresponds to a core portion, peeling the layer from the master template to obtain a template, and cutting both ends of the template to expose a concave portion that corresponds to the convex portion of the master template;

bringing into close contact with a surface having the concave portion of the mold a cladding substrate which has good adhesiveness to the mold;

introducing, by capillarity, a curable resin which forms the core into the concave portion of the mold by contacting the curable resin with one or more resin input ports and/or resin input portions; and curing the introduced curable resin, wherein one through hole or multiple through holes arranged at regular intervals in a longitudinal direction of the core portion are opened to communicate from another surface opposite to the surface of the mold that is brought into close contact with the cladding substrate to the concave portion, thereby forming the one or more resin input ports or one or more resin output ports in order for both the cut ends of the mold to be used as resin input portions; and after the curable resin is introduced into the concave portion, a resin pushing member, in which a refractive index of a portion from a tip thereof to a portion thereof corresponding to a height of the convex portion is equal to that of the curable resin and a refractive index of other portions of the member is lower than that of the curable resin, is inserted into each of the one or more resin input ports and/or the one or more resin output ports so that the tip thereof is brought into close contact with the cladding substrate, to thereby perform the step of introducing the curable resin into the concave portion of the mold by capillarity.

A fifth aspect of the invention is an optical waveguide comprising: a cladding substrate; a core body provided on the cladding substrate; and a cladding body provided on the core body, wherein the cladding body comprises on a surface thereof a hole portion extending to the core body and a lid body capable of being fitted into the hole portion and having a refractive index equal to that of the cladding body.

A sixth aspect of the invention is an optical waveguide comprising: a cladding substrate; a core body provided on the cladding substrate; and a cladding body provided on the core body, wherein the cladding body comprises on a surface thereof a hole portion extending to the core body (an area to define the hole) and an engaging body capable of being fitted into the hole portion and having a refractive index equal to that of the cladding body, and the core body comprises a fine core body having a refractive index equal to that of the core body and disposed in an area continuous to the engaging body.

Furthermore, in the invention, the cladding substrate is preferably flat. In the case that the cladding substrate is flexible, it is preferred that the back surface of the flexible substrate is supported by a flat rigid body at the time of the process for producing a polymer optical waveguide.

The refractive index of the cladding substrate is preferably 1.55 or less. The cladding substrate is preferably an alicyclic olefin resin film, and the alicyclic olefin resin film is preferably a resin film having a norbornene structure in its main chain and a polar group in its side chain.

A clad layer, which will be described in detail later and is formed on the surface of the cladding substrate in which the core portion is formed, is preferably formed by applying an UV-curable resin or heat-curable resin to the surface and then curing the resin. The clad layer is preferably formed by adhering the cladding substrate to the surface using an adhesive having a refractive index approximate to that of the cladding substrate.

The mold-forming elastomer is preferably a product obtained by curing a liquid-curable silicone elastomer. The surface energy of the mold is preferably from 10 to 30 mN/m. The Shore rubber hardness of the mold is preferably from 15 to 80°, and the root means square (RMS) roughness Rq of the mold is preferably 0.5 µm or less. The thickness of the mold is preferably from 0.1 to 50 mm.

The curable resin which makes the core portion is preferably a UV-curable resin or heat-curable resin. The viscosity of the UV-curable resin or heat-curable resin is preferably from 10 to 2000 mPa·s. The volume change when the UV-curable resin or heat-curable resin is cured is preferably 10% or less.

The refractive index of the clad layer is preferably the same as that of the cladding substrate. The refractive index of the cured product of the UV-curable resin or heat-curable resin, which is used to form the core, is preferably 1.55 or more. The difference between the refractive index of the cladding substrate and the clad layer and that of the core is preferably 0.02 or more.

DESCRIPTION OF THE INVENTION

Figure 1A:
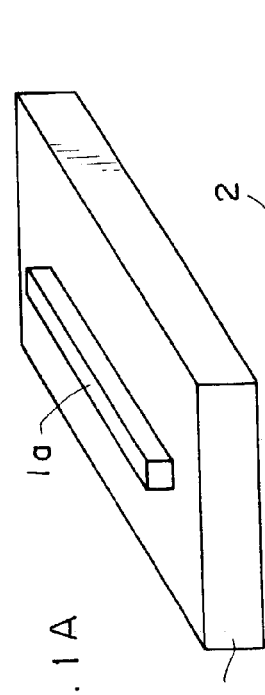
FIGS. 1A to 1G are schematic views illustrating an example of a process for producing a polymer optical waveguide of the invention.

The present invention will be described in detail hereinafter.

In the process for producing a polymer optical waveguide of the invention, a micro molding process using a mold-forming elastomer, a typical example of which is polydimethylsiloxane (PDMS), is used to form a mold having a highly precise core shape in a simple manner, and further a good adhesiveness between a low refractive index film or the like, which will become a clad layer, and the mold-forming elastomer is used to fill an UV-curable resin or heat-curable resin into only a concave portion in the mold and then cure the resin, thereby forming a core portion. The mold is then peeled and subsequently a clad layer is applied thereto and cured to form a polymer optical waveguide at low costs.

Since the refractive index of PDMS is generally as low as about 1.43, the PDMS mold can be used, as the clad layer, as it is without being peeled from the resin in the mold. In this case, it is necessary that the filled UV-curable resin or heat-curable resin is neither peeled from the mold made of PDMS nor the mold made of PDMS to which the low refractive index film, which will become the cladding substrate, is brought into close contact.

In the invention, the flexible film substrate or the rigid substrate, on the surface of which the core layer is formed, also functions as a clad layer. Only by forming, on the surface of the film or rigid substrate, a core layer (core portion) having a higher refractive index than that of the film or rigid substrate, the film or the rigid body functions as a polymer optical waveguide. At this time, in order to form the core portion, micro molding process using, as a mold, a mold-forming elastomer, a typical example of which is PDMS, is used. The mold-forming elastomer is superior in adhesiveness to the substrate and peeling ability from the substrate, and has a function in that a nanostructure can be transferred onto the elastomer. Accordingly, the elastomer has characteristics that when the elastomer is brought into close contact with the substrate, even invasion of liquid can be prevented and when forming a capillary between the film substrate and the mold, liquid is filled into only the capillary. Since the mold made of PDMS is also superior in the peeling ability, the mold can easily be peeled after the mold is brought into close contact with the substrate. In other words, in the case where the resin is filled into the mold made of PDMS and then the resin is cured, the mold can be peeled from the resin while the shape of the mold is kept at a high precision level. Thus, the elastomer is very effective for forming the core portion of an optical waveguide, and other portions.

<First Embodiment>

The present embodiment is a process for producing a polymer optical waveguide, which comprises the steps of:

preparing a mold by applying a mold-forming elastomer layer onto a surface of a master template having formed thereon a convex portion that corresponds to a core portion, peeling the layer from the master template to obtain a template, and cutting both ends of the template to expose a concave portion that corresponds to the convex portion of the master template;

bringing into close contact with a surface having the concave portion of the mold a cladding substrate which has good adhesiveness to the mold;

introducing, by capillarity, a curable resin which forms the core into the concave portion of the mold by contacting the curable resin with one or more resin input ports; and curing the introduced curable resin, wherein one through hole or multiple through holes arranged at regular intervals in a longitudinal direction of the core portion are opened to communicate from another surface opposite to the surface of the mold that is brought into close contact with the cladding substrate to the concave portion, thereby forming the one or more resin input ports or one or more resin output ports in order for both the cut ends of the mold to be used as resin output portions; and after the curable resin is introduced into the concave portion, a resin pushing member is inserted into each of the one or more resin input ports and/or the one or more resin output ports to a depth obtained by subtracting a height of the convex portion from a thickness of the mold, to thereby perform the step of introducing the curable resin into the concave portion of the mold by capillarity.

The following will describe the present embodiment in the order of its steps.

Step of Preparing a Mold

In order to produce a master template wherein a convex portion corresponding to a core portion is formed, a conventional method, such as photolithography, can be used without any limitation. A process for producing a polymer optical waveguide by electro-deposition or photoelectro-deposition, which was suggested by the present applicant, can also be applied to the formation of the master template. As the material of the master template, a silicon substrate, a glass substrate or the like can be used. The size of the convex portion formed in the master template is appropriately decided depending on the use of the polymer optical waveguides to be formed, or other factors. For example, in the case of optical waveguides for a single mode, cores about 10 µm square are generally used. In the case of optical waveguides for a multimode, cores from about 50 to 100 µm square are generally used. However, optical waveguides having larger core portions, which have a size of several hundreds of µm, may also be used depending on use.

A template is formed by forming a layer made of a mold-forming elastomer on the surface, having the convex portion, of the master template formed as described above and then peeling the layer.

Preferably, the material of the mold-forming elastomer can easily be peeled from the master template and has, as a mold (which is repeatedly used), larger mechanical strength and dimensional stability than certain levels. The mold-forming elastomer layer is made of the mold-forming elastomer, or the mold-forming elastomer to which various additives are added as necessary.

Since individual optical waveguide shapes formed in the master template must be precisely transferred to the mold-forming elastomer, the elastomer preferably has a smaller viscosity than a limit value, for example, a viscosity of about 2,000 to 7,000 mPa·s. A solvent for adjusting the viscosity may be added thereto insofar as undesirable effects are not exerted by the solvent.

The viscosity can be measured using an ordinary rotary-type viscometer.

As the material of the mold-forming elastomer, a curable silicone elastomer (of a heat-curing type, a room-temperature curing type, or light curing type) is preferably used from the viewpoint of peeling ability, mechanical strength and dimensional stability.

The curable silicone elastomer used in the invention is a silicone elastomer having a three-dimensionally crosslinkable structure. The silicone elastomer having a three-dimensionally crosslinkable structure is usually obtained by polymerization of polyfunctional (tri-functional or tetra-functional) units, and has a crosslinking structure. Examples of the curable silicone elastomer used in the invention include silicone rubber obtained by polymerization to have a molecular weight (siloxane unit) of about 5,000 to 10,000 by heating after addition of a vulcanizing agent and other additives.

The reason why it is necessary to use the curable silicone elastomer in the invention is as follows.

Since the curable silicone elastomer has a low surface energy on the basis of —Si—O-bonds, the elastomer essentially exhibits superior releasing ability and incompatibility. However, by controlling the curing conditions thereof, and so forth, the elastomer can also exhibit superior adhesiveness. As a result, a mold whose peeling ability is compatible with adhesiveness can be obtained.

Examples of the factor controlling the curability include the kind and the number of reactive groups of the constituting components; curing time; temperature; and radiating energy. Thus, examples of a method for controlling the curing conditions include a method of adding monofunctional or bifunctional polydimethylsiloxane, a reaction controlling agent (e.g., an acetylene alcohol, cyclic methylvinylcyclosiloxane, or a siloxane-modified acetylene alcohol), or the like to the system; and a method of adjusting the amount of a catalyst, the reaction temperature, the reaction time, light (UV) radiating intensity, or other factors. If the curing conditions are controlled by any one of these methods, the molecular weight of the curable silicone elastomer, the remaining amount of silanol as a reactive group, or other factors can be adjusted so that the releasing ability, hardness, surface hardness, adhesiveness, transparency, heat resistance, chemical stability or the like can be freely controlled.

Examples of the curable silicone elastomer include heat-curable (condensing type, or adding type) silicone resins and light-curable silicone resins. Specific examples thereof are as follows.

Examples of the condensing type curable silicone elastomers among the heat-curable silicone elastomers include curable silicone elastomer synthesized by blending polydimethylsiloxane having a silanol group at its terminal as a base polymer with polymethylhydrogensiloxane as a crosslinking agent and then heating and condensing them in the presence of a catalyst, for example, an organic metal salt such as organic tin, or an amine; curable silicone elastomer synthesized by reaction of polydiorganosiloxane having at its terminal a reactive functional group such as a hydroxyl group or an alkoxy group; and polysiloxane elastomer synthesized by condensing a silanol obtained by hydrolyzing a chlorosilane having tri- or more-functionality, or a mixture thereof with a monofunctional or bifunctional chlorsilane.

Examples of the adding type curable silicone elastomer among the heat-curable silicone elastomer include curable silicone elastomer synthesized by blending polydimethylsiloxane having a vinyl group as a base polymer with polydimethylhydrogensiloxane as a crosslinking agent to allow reacting and curing them in the presence of a platinum catalyst. The adding type curable silicone elastomer is divided into a solvent type, an emulsion type and a non-solvent type from the viewpoint of the form thereof. However, the non-solvent type is preferred in the invention.

Examples of the light-curable silicone elastomer include curable silicone elastomer synthesized using a photo-cationic catalyst; and curable silicone elastomer synthesized using a radical curing mechanism.

A liquid-type resin which has a low molecular weight and can give sufficient permeating property is preferably used as the curable silicone elastomer. The viscosity of the curable silicone elastomer is preferably from 500 to 7,000 mPa·s, more preferably from 2,000 to 5,000 mPa·s.

As the curable silicone elastomer, a silicone elastomer having a methylsiloxane group, an ethylsiloxane group or a phenylsiloxane group is preferred. A curable polydimethylsiloxane (PDMS) elastomer is particularly preferred.

It is desired that the master template is beforehand subjected to a releasing treatment, such as coating with a releasing agent, to facilitate the peeling of the master template from the mold.

In order to form the mold-forming elastomer layer on the surface having the convex portions of the master template, the material of the mold-forming elastomer is deposited onto the surface by coating, casting or some other method and then and, if necessary, the resultant layer is subjected to drying treatment, curing treatment and so forth.

The thickness of the mold-forming elastomer layer is appropriately decided under consideration of the handling performance thereof as a mold, and is preferably from 0.1 to 50 mm.

Thereafter, the mold-forming elastomer layer is peeled from the master template to form a template.

Next, by means of a cutter or the like, both ends of the template are cut in such a manner that concave portions corresponding to the convex portions formed in the template are exposed, so as to form a mold. The cutting of both the ends of the template so as to expose the concave portions is carried out for introducing a UV-curable resin or heat-curable resin into the concave portions in the mold or discharging the resin from the concave portions by capillarity, using the exposed concave portions as resin input portions or resin output portions.

The formation of the exposed portions at both the ends can be performed using a cutter or the like, and can be performed by punching using a puncher besides the cutting. Other means can be used if the exposed portions can be constructed at both ends.

The surface energy of the mold is preferably from 10 to 30 mN/cm, more preferably form 15 to 24 mN/cm from the viewpoint of the adhesiveness thereof to a film substrate. The surface energy can be obtained using any solvent having a known surface tension and measuring the contact angle between the solvent and the mold.

The Shore rubber hardness of the mold is preferably from 15 to 80°, more preferably from 20 to 60° from the viewpoint of template taking-off performance or peeling ability. The rubber hardness of the mold can be measured with a durometer.

The surface roughness (root mean square roughness (RMS) Rq) of the mold is preferably 0.5 μm or less, preferably 0.1 μm or less from template taking-off performance. The surface roughness of the mold can be measured with a contact-type surface roughness meter (α step 500, manufactured by KLA-Tencor Corporation).

Step of Bringing a Cladding Substrate into Close Contact with the Mold

The optical waveguide produced according to the invention can also be used as an optical interconnection between a coupler and a board, an optical branching filter, or the like.

Thus, the material of the above-mentioned cladding substrate is selected depending on the purpose thereof, considering the optical properties (for example, the refractive index and the light transparency), mechanical strength, heat resistance, adhesiveness to the mold and flexibility of the material, and other factors. In the invention, it is preferred to use a flexible film substrate or a rigid substrate to produce the polymer optical waveguide.

In the invention, a curable resin is introduced into a resin input port or the like, which will be described in detail later, and the resin is pushed by a pin (resin pushing member); therefore, in order to prevent unnecessary deformation resulting from the introduction or the pushing, or in order to improve workability, the cladding substrate is desirably a flat rigid substrate. When it is intended that the cladding substrate is made to a flexible film substrate, the same advantages can be expected by supporting the film substrate by a flat rigid body such as a glass substrate at the time of the process for producing an optical waveguide.

Examples of the film substrate used from the viewpoint that it has a relatively small refractive index and appropriate transparency include an alicyclic aryl film, an alicyclic olefin film, a cellulose triacetate film, and a fluorine-containing resin film. The refractive index of the film substrate is preferably less than 1.55, more preferably less than 1.53 in order to securely give a satisfactory refractive index difference between the clad and the core portion.

The above-mentioned refractive index (as well as the refractive index of the core portion or any other portion) is measured using, for example, an Abbe refractometer.

As the alicyclic acryl film, usable are an OZ-1000, OZ-1100 (made by Hitachi Chemical Co., Ltd.) and the like, wherein an aliphatic cyclic hydrocarbon such as tricyclodecane is introduced into an ester substituent.

The alicyclic olefin film is preferably used in the invention because of the transparency and low refractive index thereof. Examples of the alicyclic olefin film include a film made of an olefin having a norbornene structure in its main chain, and a film made of an olefin having a norbornene structure in its main chain and a polar group such as an alkyloxycarbonyl group (its alkyl group: an group having 1 to 6 carbon atoms, or a cycloalkyl group) in its side chain. A film made of an alicyclic olefin resin having a norbornene structure in its main chain and a polar group such as an alkyloxycarbonyl group in its side chain, as described above, has superior optical properties (such as a low refractive index (refractive index: about 1.50, which can give a refractive index difference between the core and clad) and a high light transparency), and is superior in adhesiveness to the mold and heat resistance; therefore, this film is particularly suitable for producing the polymer optical waveguide of the invention. Specific examples thereof include an Arton film (manufactured by JSR Corp.) and a Zenoa film (manufactured by Zeon Corporation)

The thickness of the film substrate is appropriately selected, considering the flexibility, rigidity and easiness for the handing thereof, and so on. In general, the thickness is desirably from about 0.1 to 0.5 mm.

Step of Introducing a Curable Resin into the Concave Portion of the Mold

In this step, a curable resin which is used to form a core is brought into contact with resin input ports to introduce (fill) the curable resin into the concave portion of the mold by capillarity.

The inventors already suggested a process of bringing one of both ends of a mold, where concave portions are exposed, to which a cladding substrate is closely brought into contact with a curable resin which is used to form a core so as to introduce the curable resin into the concave portion in the mold by capillarity.

This process is effective when the length of the produced optical waveguide is within the range of about 5 to 10 cm. However, the process has a drawback in that when the length is above the range, it takes extremely much time to fill the curable resin thereby impairing the productivity. Thus, a process of dividing the optical waveguide length to shorten the filling time can be considered. In this case, an outlet for the air and the resin which corresponds to an inlet for the resin is necessary, and thus it is necessary to perform the formation of the inlet and the outlet for the resin and perform the formation of the optical waveguide without damaging the shape thereof.

Thus, in the invention, the following is suggested: a process of opening through holes so as to be communicated from another surface opposite to the surface, brought into close contact with a cladding substrate, of a mold to a concave portion as described above, so as to form an introducing port (resin input port) for the resin at a position except both ends of the mold, thereby making the length of the capillarity substantially short.

In the present embodiment, the curable resin is introduced from the resin input port made in the mold, and the curable resin is outputted from both the cut ends of the mold as resin output ports.

Figure 1B:
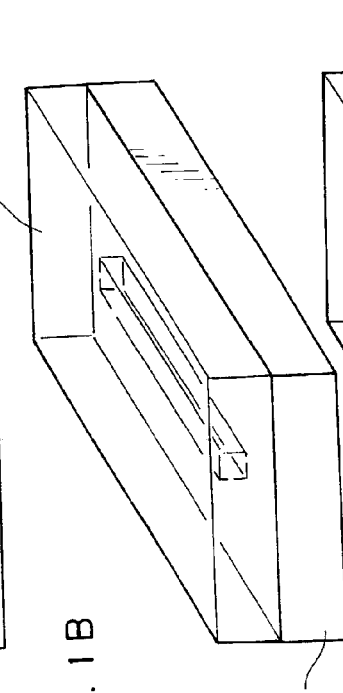
Figure 1C:
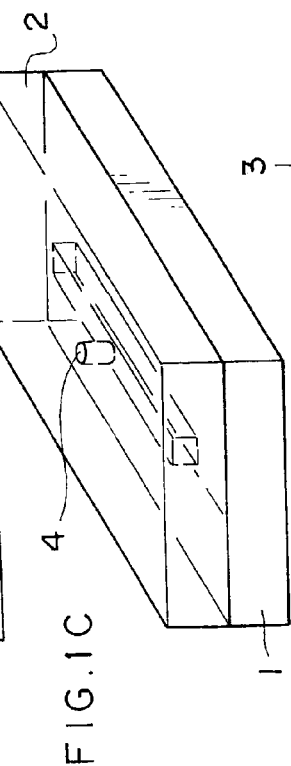
Figure 1D:
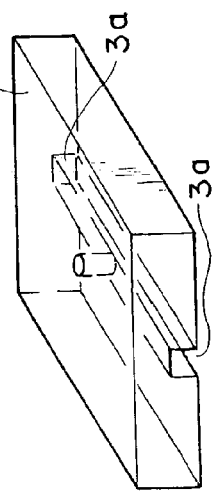
Figure 1E:
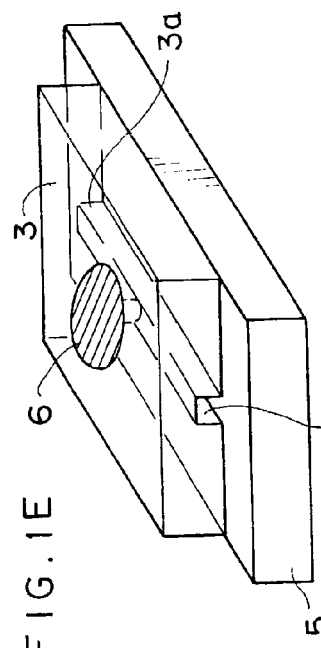

FIGS. 1A to 1G schematically illustrate an example of the process for producing the polymer optical waveguide of the invention. FIGS. 1A and 1B illustrate the steps of preparing a mold, and FIGS. 1D and 1E illustrate the steps of curing a curable resin. In the process illustrated in FIG. 1, a resin-filling hole 4 (resin input port) which is communicated to a concave portion as described above is made in another surface opposite to the surface, brought into close contact with a cladding substrate, of a mold 2 formed by use of a master template 1 having a convex portion 1a corresponding to a core portion, as illustrated in FIG. 1C. The hole 4 is in the middle of the optical waveguide which will be produced along the longitudinal direction thereof. As illustrated in FIG. 1E, a core-forming curable resin 6 is filled into the concave portion from the hole 4, and then the resin 6 is discharged from both cut ends 3a (resin output ports) of the mold 3, thereby subtracting the filling length substantially to half. Thus, the filling time can be decreased. In order to fill the curable resin 6 into the filling hole 4, it is desirable to use a syringe-form member.

The resin input port may be formed before or after both the ends of the mold are formed in the step of preparing the mold. The resin is not always discharged from the resin output port in the step of introducing the resin. That is, the resin output port also functions as an outlet for the air at the initial stage of the introduction.

Figure 1F:
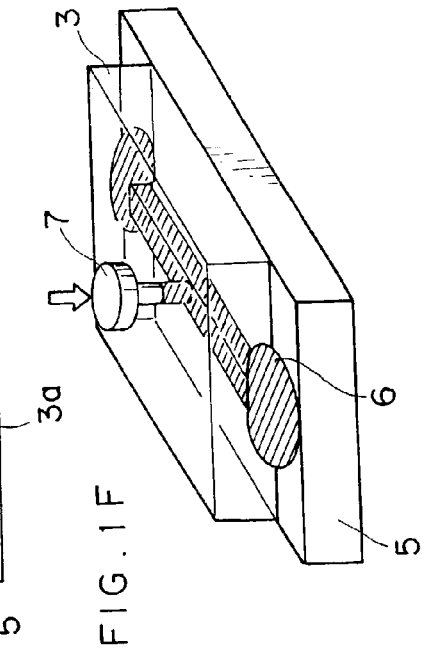
Figure 1G:
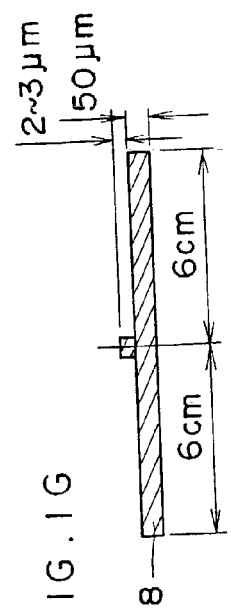

After the curable resin is introduced into the concave portion in the invention, a pin 7 (resin pushing member) is inserted into the hole 4 by the depth obtained by subtracting the height of the convex portion 1a from the thickness of the mold 3 as illustrated in FIG. 1F, thereby pushing out the resin remaining in the hole 4 (resin input port) to core grooves. In this manner, the disturbance of the optical waveguide shape after the filling of the resin is completed can be suppressed at a minimum level. In the case of using such a process, the hole 4 portion of the core and the optical waveguide surface cannot be perfectly made to have the same height; therefore, a core portion 8 having a small projection is formed as illustrated in FIG. 1G. However, the height of the projection can be suppressed to at largest 10 µm (in reality, several µm or less) by measuring and controlling the height of the mold made of PDMS precisely. When the combination of the refractive indexes and sizes of a core layer material and a clad layer material used in the invention, which will be described in detail later, is used to calculate the optical waveguide loss in the case that this projection is present, the loss is larger than the loss in the case that no projection is present. However, the increased value is about 0.02 dB. This value is sufficiently small as compared with other losses, and thus can be ignored.

Figure 2D:
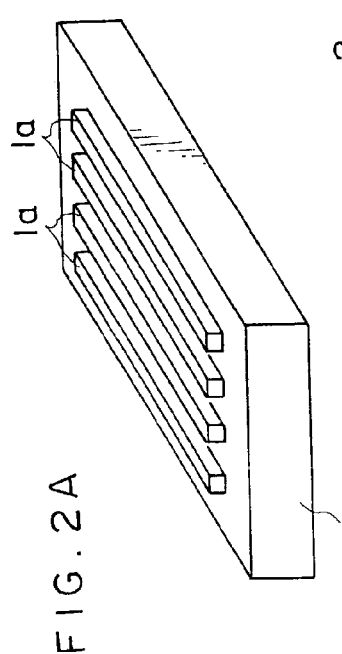
FIGS. 2A to 2F are schematic views illustrating another example of the process for producing a polymer optical waveguide of the invention.
Figure 2E:
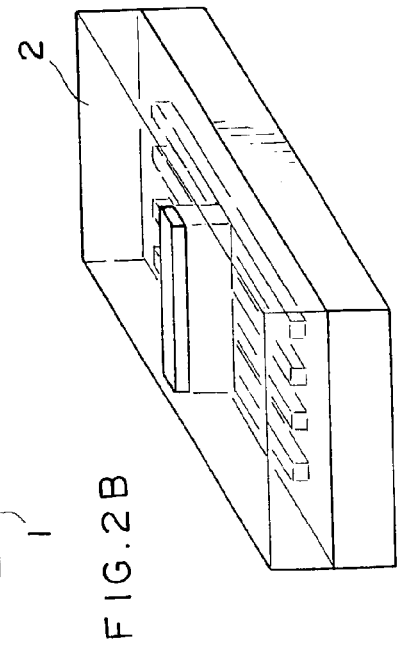
Figure 2F:
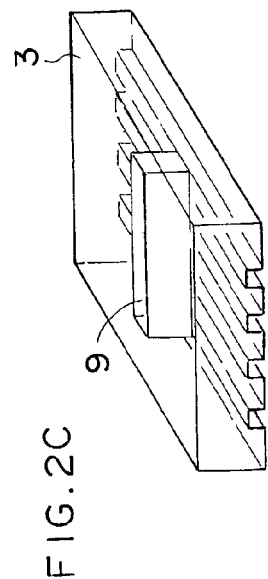
Figure 2A:
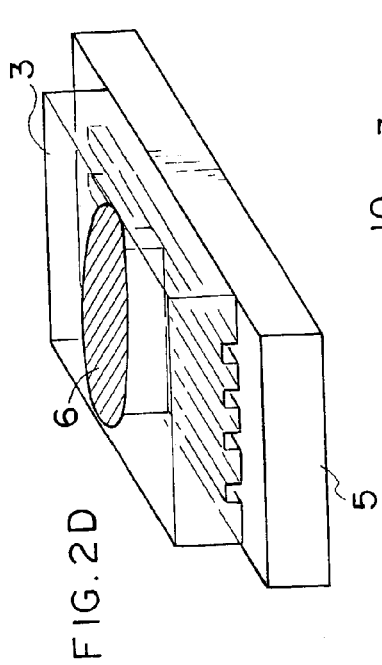
Figure 2B:
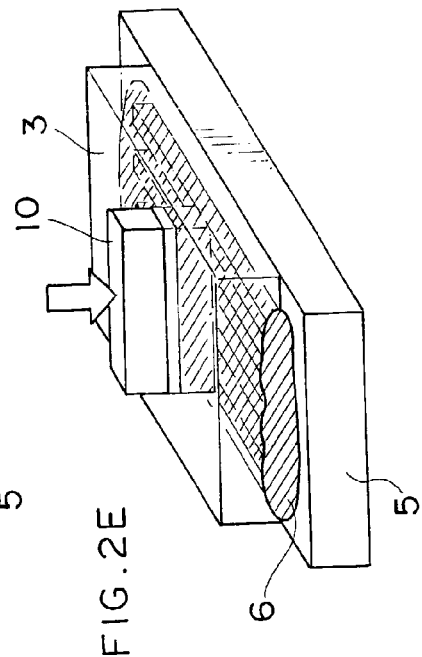
Figure 2C:
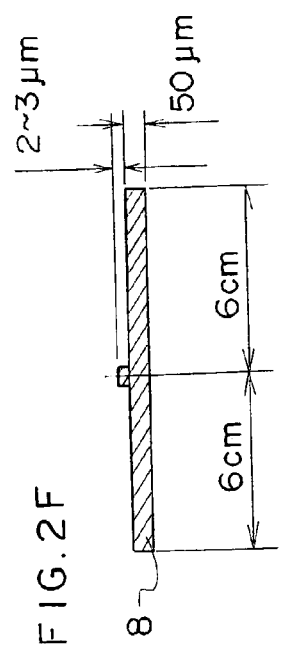

FIGS. 2A to 2F illustrate a process for forming plural core portions as an example of the process for producing the polymer optical waveguide of the invention. The respective steps illustrated in FIG. 2 are basically the same as in the example illustrated in FIG. 1. In the invention, the resin input port is not limited to the hole 4 in FIG. 1 and may be a resin input port 9 having an opening extending to plural concave portions in the direction perpendicular to optical waveguides of a mold 3 as shown in FIG. 2C.

By configuring the resin input port in this manner, a curable resin can be simultaneously introduced into plural concave portions for cores as illustrated in FIG. 2, whereby the time for forming the cores can further be shortened. Thus, the present example is effective for reducing costs.

Figure 3:
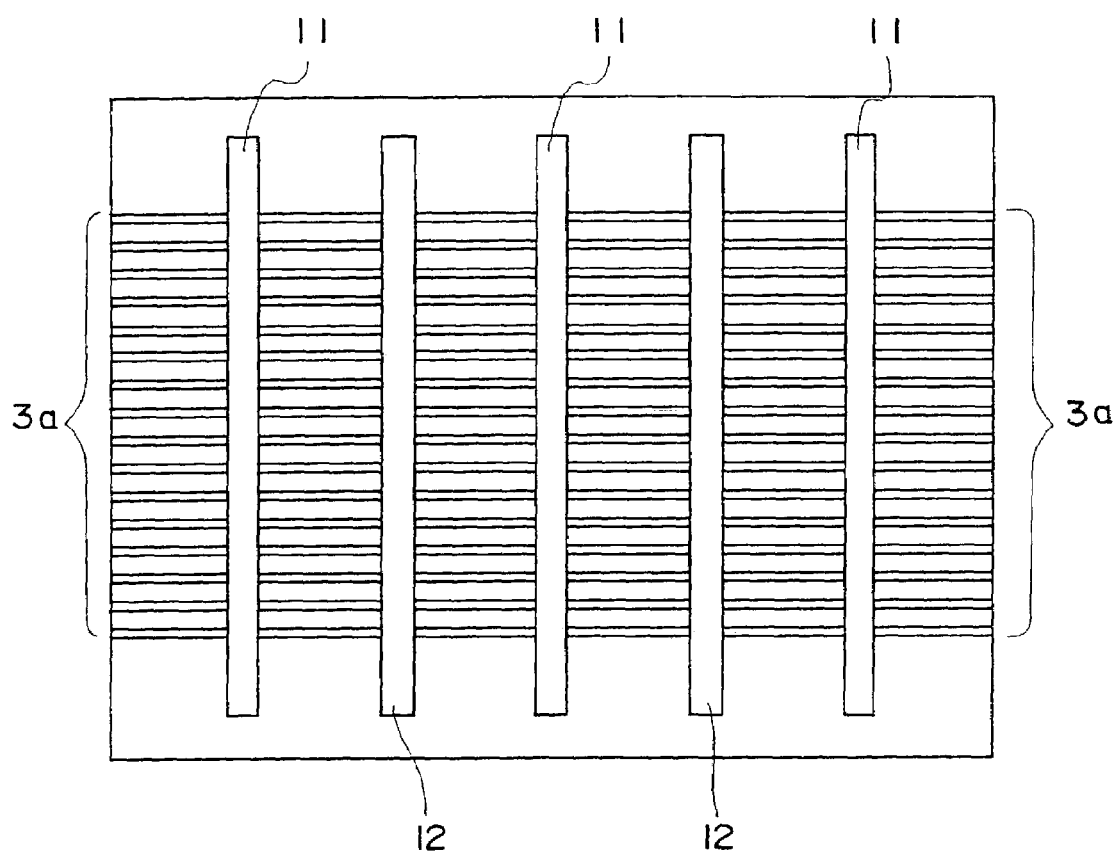
FIG. 3 is a front view showing an example of a state before a curable resin is filled in the invention, viewed from a mold side.

FIG. 3 is a front view of an example in which another mold is used in the formation of the plural core portions as illustrated in FIG. 2, which is viewed from the side of the mold before the step of introducing a curable resin. In this case, multiple through holes 11 and 12 are constructed in the mold 3, as illustrated in FIG. 3. As described herein, a plurality of the through holes may be made.

When the multiple through holes 11 and 12 are made as illustrated in FIG. 3, it is necessary to make the through holes at regular intervals in the longitudinal direction of the core portion. The holes are used alternately as resin input ports 11 and resin output ports 12, and a core-forming curable resin is brought into contact with the resin input ports 11 and introduced into the concave portions by capillarity, whereby the resin-filling speed can be improved. That is, when multiple through holes are made, resin input ports and resin output ports are necessarily present.

In the same manner as in the case of the above-mentioned resin output portion, the resin is not always discharged from the resin output ports 12. That is, the resin output ports 12 also function as air outlets.

The reason why the through holes are made at regular intervals in the longitudinal direction of the core portion as described above is that the filling length can be made substantially short. Like the resin output ports 12 made correspondingly to the resin input ports 11 in FIG. 3, it is necessary that holes for releasing the air (resin output holes 12) are invariably made adjacently to and correspondingly to the resin input ports 11. It is necessary that the holes for releasing the air are open until the resin-filling is completed; therefore, in the case that one of the holes for releasing the air is used for the resin-filling from the right and left resin input ports like a resin output port 12 in FIG. 3, there may arise a case where the filling from either one of the resin input holes is complete earlier so that the hole for releasing the air (resin output port 12) is closed. In this case, the filling from the other side does not progress. As a result, a defect occurs in the optical waveguide (core portion). In order to prevent this, it is advisable that the curable resins from the right and left sides are rendered to extend to the hole for releasing the air (resin output port 12) at the same time. In order to realize this state readily, the through holes are made at regular intervals.

Figure 4:
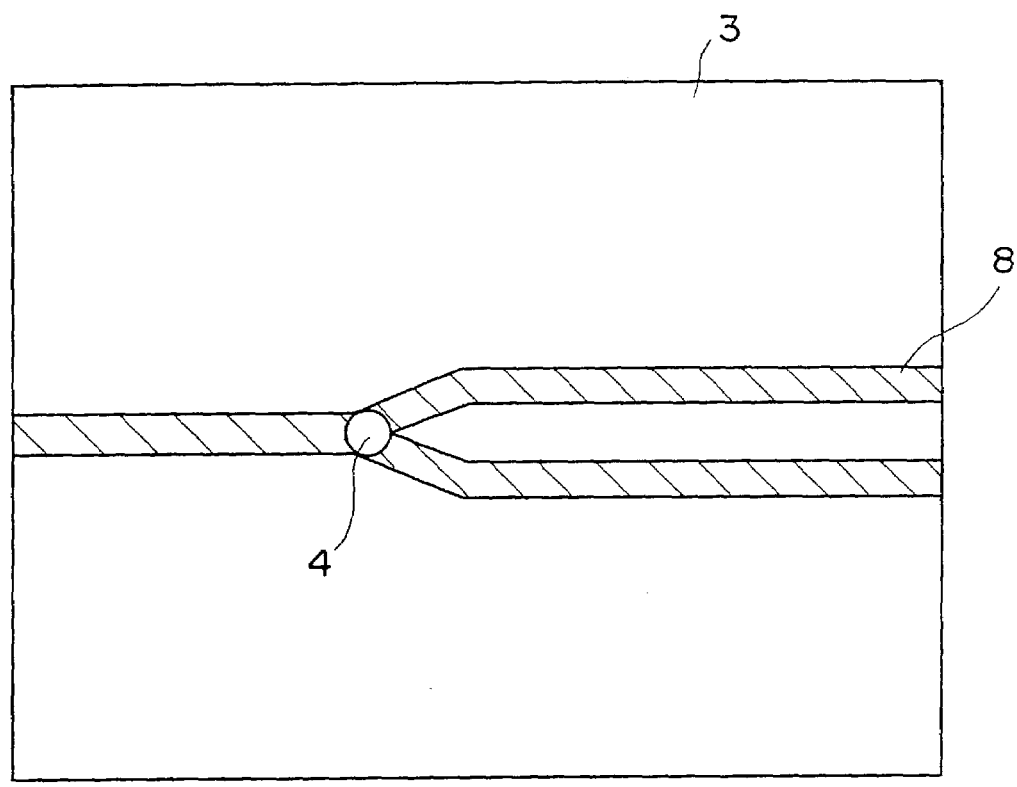
FIG. 4 is a front view showing another example of the state before a curable resin is filled in the invention, viewed from a mold side.

FIG. 4 is a front view of an example in which a core portion having an optical waveguide branch in the longitudinal direction of the core, which is viewed from the side of a mold before the step of introducing a curable resin. In the case where an optical waveguide has a branch, it is preferred in the invention that a resin input port 4 or a resin output port 4 as described above is formed at least at the position of the optical waveguide branched portion of the mold 3, as illustrated in FIG. 4. By forming the resin input port 4 or the resin output port 4 at the optical waveguide branched portion in this way, the resin can be introduced in the respective branched directions in the same amounts in the case where the resin is inputted and the resins from the respective directions can be made to extend to the branched portion in the case where the resin is outputted.

The resin input port 4 or the resin output port 4 can be formed by forming the mold 3 and subsequently making a hole directly in the mold using a drill or the like. In view of production costs, however, it is desirable to make the hole at the same time when the mold is formed.

From such a viewpoint, it is preferred in the invention to make the resin input port 4 and/or the resin output port 4 at the same time when the mold 3 is prepared by forming the convex portion corresponding to the resin input port 4 and/or the resin output port 4, as well as the convex portion 1a corresponding to the core portion, in the master template 1 in the step of preparing the mold 3.

Specifically, the convex portion corresponding to the resin input port 4 and/or the resin output port 4 is formed, for example, at the upper side (in FIG. 1A) of the convex portion 1a, which corresponds to the core portion, in the master template 1. The master template is then used to prepare the mold as described above, whereby it is unnecessary to make any hole in the mold 3.

The shape of the convex portion corresponding to the resin input port 4 and/or the resin output port 4 is not particularly limited, and may have a tapered shape or multi-step shape as described later.

In order to fill the curable resin 6 into the gap (the concave portion in the mold) made between the mold and the cladding substrate 5 by capillarity, it is necessary that the used curable resin 6 has such a sufficiently low viscosity to allow the filling. Usually, when capillarity is used for filling the liquid, the filling speed decreases as the diameter of the capillarity is reduced. Thus, the filling at a practical speed is impossible when the diameter is too small. Consequently, when capillarity is used, it is an important issue that the filling seed is raised. In order to raise the filling speed, it is effective to lower the viscosity of the liquid and reduce the pressure. Usually, the viscosity is preferably 5000 mPa·s or less, more preferably 1000 mPa·s or less.

It is necessary that the refractive index of the curable resin 6 after being cured is higher than that of the polymeric material which constitutes the clad. Additionally, in order to reproduce very precisely the original shape of the convex portion 1a corresponding to the core portion formed in the master template 1, it is necessary that the volume change of the curable resin 6 before and after being cured is small. For example, a reduction in the volume induces a loss of guided waves. Accordingly, the volume change of the core-forming curable resin 6 before and after being cured desirably is as small as possible, and preferably 10% or less, more preferably 6% or less. In the case where a solvent is used to make the viscosity low, the volume change of the resin before and after being cured increases. Desirably, such a case should be avoided.

From the above-mentioned viewpoint, the viscosity of the curable resin 6 is preferably from 10 to 2,000 mPa·s, more preferably from 20 to 1,000 mPa·s, and still more preferably from 30 to 500 mPa·s. However, in the case where a solvent or the like is used to make the viscosity of the curable resin 6 low, the volume change is large when the resin is cured. Thus, it is impossible that the original shape is precisely kept as described above. It is therefore necessary to select, as the filling curable resin 6 to be used, a solvent-free material whose volume change is as small as possible.

As described above, it is necessary that the refractive index of the cured product of the curable resin 6, which is used to form the core, is larger than that of the above-mentioned film substrate or rigid substrate, which will become the clad. The refractive index difference between the clad and the core is preferably 0.02 or more, more preferably 0.05 or more. However, the refractive index of the film substrate which has a high adhesiveness to the curable resin is approximately 1.50 in many cases; therefore, the refractive index of the curable resin is preferably 1.52 or more, more preferably 1.55 or more.

As the curable resin 6, a UV-curable resin or heat-curable resin is preferably used. As the material of the curable resin, an epoxy-, polyimide-, or acryl-UV-curable resin is preferably used.

In order to bring one end of the mold to which the film substrate is closely brought into contact with the curable resin 6, which is used to form the core, in this step and facilitate filling of the curable resin into the convex portion in the mold 3 by capillarity, the pressure in the whole of this system is desirably reduced (to about 0.1 to 200 Pa). Instead of reducing the pressure in the whole of the system, the air may be sucked by a pump from the end that is different from the end contacting the curable resin or a pressure is applied into the end contacting the curable resin.

In order to facilitate the filling, it is also effective to heat the curable resin which is brought into contact with the one end of the mold, thereby making the viscosity of the curable resin still lower, instead of the pressure reduction or the pressure application.

As described above, in the invention, the curable resin 6 is introduced into the concave portion in the mold 3 and subsequently the resin pushing member 7 is inserted into all of the resin input ports 4 and/or the resin output ports 4 by the depth obtained by subtracting the height of the convex portions from the thickness of the mold 3. The shape of the pushing member 7 is not particularly limited, and may have a pin shape as illustrated in FIG. 1F, or a plate shape or a prism shape.

It is preferred in the invention that the resin pushing member 7 has such a shape that when the member 7 is inserted into the resin input port 4 and/or the resin output port 4, the member 7 is fixed so as to be inserted by the depth obtained by subtracting the height of the convex portion 1a from the thickness of the mold 3. By making the shape of the resin pushing member 7 in this manner, at the time of the insertion of the pushing member 7, the above-mentioned projection portion can be made small without paying attention to the position where the insertion should be stopped. Thus, a surface-position error between the ceiling of the core portion of the optical waveguide and the tip of the resin pushing member can be reduced to a minimum.

Figure 5:
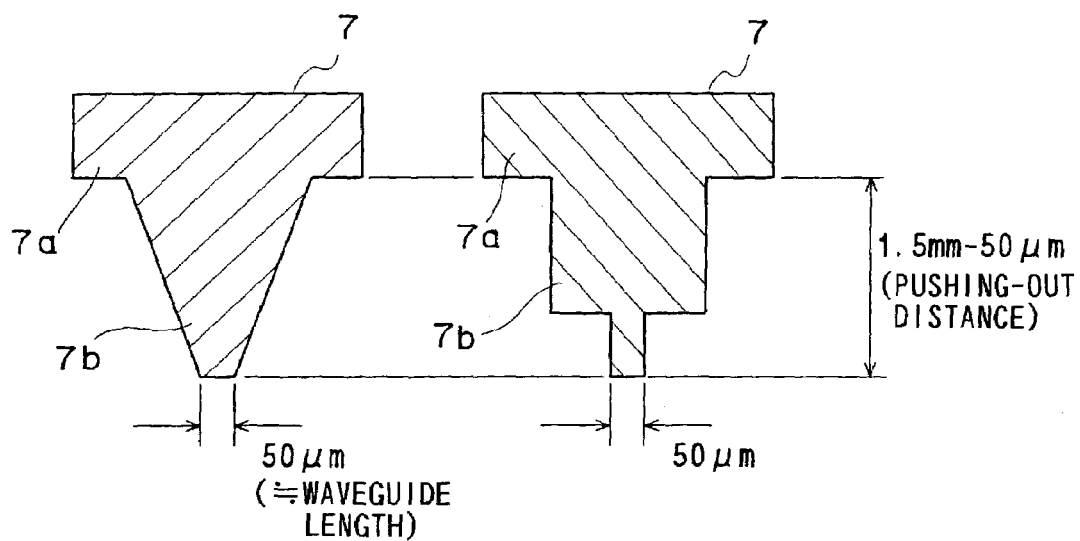
FIGS. 5A and 5B are sectional views of pins (resin pushing members) used in the invention.

FIGS. 5A and 5B illustrate sections of resin pushing members 7 having a pin shape, which are used in the invention. Both of the resin pushing members illustrated FIGS. 5A and 5B are fixed so as to be inserted, by the depth obtained by subtracting the height of the convex portion 1a from the thickness of the mold 3, according to their fixing portion 7a and their inserting portion 7b. In FIG. 5A, the shape of the inserting portion 7a is made to have a tapered shape, and in FIG. 5B the shape of the inserting portion 7a is made to have a two-step shape, whereby the above-mentioned fixing is attained and further the portion contacting the portion, which will become the ceiling of a core is made to have a minimum width approximate to the size of the optical waveguide.

As described above, the shape of the pin to be inserted is made to have the conical shape whose narrowest tip has a diameter of 50 μm (optical waveguide size) or the pin whose diameter is changed two-stepwise, and the hole 4 (resin input port) is formed to have a shape corresponding to the pin, whereby a risk that the pin is fractured at the time of the insertion thereof can be reduced.

The pin having the above-mentioned shape can easily be formed by micro electric discharge machining or some other method.

It is preferred in the invention that the material of at least the tip of the resin pushing member 7 is the same as that of the mold-forming elastomer. If the material of at least the tip of the resin pushing member is made to the same curable silicone elastomer material of the mold 3, there does not arise a problem in that after the core is cured, the curable resin adheres to the tip of the resin pushing member 7 to thus stretch the resin.

The resin pushing member 7 preferably has UV transparency. The polymeric material filled into the core portion of an optical waveguide is made mainly of an UV-curable resin in many cases; therefore, if the resin pushing member 7 is made of a material having UV transparency, it is possible to eliminate a risk that the curable resin which constitutes the concave portion in the mold 3 and which is present just under the resin pushing member is not cured.

Step of Curing the Introduced Curable Resin

In order to cure the introduced curable resin 6, an ultraviolet lamp, an ultraviolet LED, a UV radiating device or the like is used. In the case where a heat-curable resin is introduced, heating in an oven or the like is carried out.

After the resin is cured, the mold 3 is peeled and a clad layer is formed on the surface of the cladding substrate 5 where the core portion is formed, so as to produce a polymer optical waveguide. As described above, the mold 3 can be used, as it is, as a clad layer. In this case, the mold 3 is used, as it is, as a clad layer 13 without peeling the mold 3.

Examples of the clad layer include the same film as used in the above-mentioned cladding substrate, a layer obtained by curing an applied curable resin (UV-curable resin or heat-curable resin), and a polymeric film obtained by drying the applied polymeric material solution. In the case where a film is used as the clad layer, the film is brought into close contact with the cladding substrate using an adhesive. At this time, the refractive index of the adhesive agent is desirably approximate to that of the film.

In order to securely give a refractive index difference between the clad and the core, the refractive index of the clad layer is preferably less than 1.55, more preferably less than 1.53. It is preferred from the viewpoint of light confinement that the refractive index of the clad layer is made equal to that of the film substrate.

<Second Embodiment>

The present embodiment is a process for producing a polymer optical waveguide, which comprises the steps of:

preparing a mold by applying a mold-forming elastomer layer onto a surface of a master template having formed thereon a convex portion that corresponds to a core portion, peeling the layer from the master template to obtain a template, and cutting both ends of the template to expose a concave portion that corresponds to the convex portion of the master template;

bringing into close contact with a surface having the concave portion of the mold a cladding substrate which has good adhesiveness to the mold;

introducing, by capillarity, a curable resin which forms the core into the concave portion of the mold by contacting the curable resin with one or more resin input ports and/or resin input portions; and curing the introduced curable resin, wherein one through hole or multiple through holes arranged at regular intervals in a longitudinal direction of the core portion are opened to communicate from another surface opposite to the surface of the mold that is brought into close contact with the cladding substrate to the concave portion, thereby forming the one or more resin input ports or one or more resin output ports in order for both the cut ends of the mold to be used as resin input portions; and after the curable resin is introduced into the concave portion, a resin pushing member is inserted into each of the one or more resin input ports and/or the one or more resin output ports to a depth obtained by subtracting a height of the convex portion from a thickness of the mold, to thereby perform the step of introducing the curable resin into the concave portion of the mold by capillarity.

The present embodiment is the same as the first embodiment except that both the ends of the mold which are formed by cutting or some other procedures in the first embodiment are used not as the resin output portions, but as resin input portions. In other words, the step of forming a mold, the step of curing an introduced curable resin, and other steps in the present embodiment are the same in the first embodiment, and only in the step of introducing the curable resin into a concave portion in the mold, both of cut ends of the mold are used to input the resin.

Specifically, in the respective steps illustrated in FIG. 1, the curable resin 6 is not brought into contact with the hole 4 in FIG. 1E, but is brought into contact with both the cut ends 3a of the mold 3 to render the hole 4 to function as a resin output port. In the formation of the plural core portions illustrated in FIG. 3, the curable resin 6 is brought into contact with both the cut ends 3a of the mold 3 in the same manner. In this case, however, a hole for releasing the air must be inevitably constructed when the resin is introduced, as described above; therefore, it is necessary to reverse the resin input port and the resin output port described in the first embodiment to each other. Namely, it is necessary to convert the resin input port 11 in FIG. 3 to a resin output port and convert the resin output port 12 to a resin input port.

According to the present embodiment, a curable resin can be effectively filled into a concave portion of the mold, which will become a core portion, and a polymer optical waveguide exhibiting only a small loss of guided waves can easily be produced at low costs in the same manner as in the first embodiment.

<Third Embodiment>

The invention is a process for producing a polymer optical waveguide, which comprises the steps of:

preparing a mold by applying a mold-forming elastomer layer onto a surface of a master template having formed thereon a convex portion that corresponds to a core portion, peeling the layer from the master template to obtain a template, and cutting both ends of the template to expose a concave portion that corresponds to the convex portion of the master template;

bringing into close contact with a surface having the concave portion of the mold a cladding substrate which has good adhesiveness to the mold;

introducing, by capillarity, a curable resin which forms the core into the concave portion of the mold by contacting the curable resin with one or more resin input ports; and curing the introduced curable resin, wherein one through hole or multiple through holes arranged at regular intervals in a longitudinal direction of the core portion are opened to communicate from another surface opposite to the surface of the mold that is brought into close contact with the cladding substrate to the concave portion, thereby forming the one or more resin input ports or one or more resin output ports in order for both the cut ends of the mold to be used as resin output portions; and after the curable resin is introduced into the concave portion, a resin pushing member, in which a refractive index of a portion from a tip thereof to a portion thereof corresponding to a height of the convex portion is equal to that of the curable resin and a refractive index of other portions of the member is lower than that of the curable resin, is inserted into each of the one or more resin input ports and/or the one or more resin output ports so that the tip thereof is brought into close contact with the cladding substrate, to thereby perform the step of introducing the curable resin into the concave portion of the mold by capillarity.

The present embodiment is the same as the first embodiment except that the core portion is not made of only the curable resin introduced into the concave portion in the mold, but the core portion is composed of the curable resin and the tip of the inserted resin pushing member. In other words, the step of preparing a mold, the step of curing an introduced curable resin, and other procedures in the present embodiment are the same in the first embodiment, and only in the step of introducing the curable resin into a concave portion in the mold, a resin pushing member is inserted in such a manner that the tip of the resin pushing member is brought into close contact with a cladding substrate.

Specifically, in the respective steps illustrated in FIG. 1, the pin 7 (resin pushing member) is not inserted by the depth obtained by subtracting the height of the convex portion from the thickness of the mold in FIG. 1F, but a pin 7, wherein the refractive index of the portion from its tip to its convex portion height corresponding portion is equal to that of the curable resin 6 and the refractive index of other portions is lower than that of the curable resin 6, is used and the pin 7 is inserted into the hole 4 (resin input port) so that its tip is brought into close contact with the cladding substrate 5.

In this manner, defects resulting from the situation that the hole 4 is made in the mold 3 can be minimized in the core and the clad of the optical waveguide. In this case, it is particularly preferred to use, as the material of the portion from the tip of the pin 7 to the portion corresponding to the core portion (convex portion height corresponding portion), a substance obtained by curing the same as the curable resin which is used to form the core, since the loss of guided waves can be further reduced.

Figure 6:
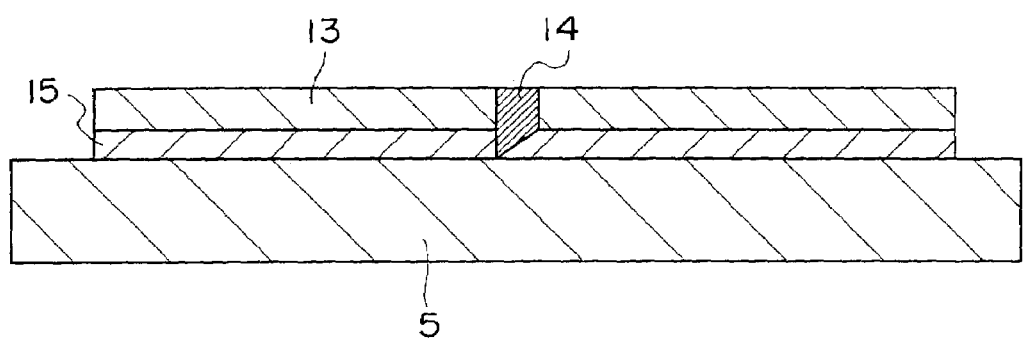
FIG. 6 is a sectional view illustrating an example of a polymer optical waveguide produced according to the invention.

FIG. 6 is a sectional view of a polymer optical waveguide in the case of using a pin 14 wherein its tip portion is formed to have a section having a constant angle. In the invention, a member that functions as a reflecting mirror that is capable of changing a direction of signal light passing through the core of the optical waveguide, as illustrated in FIG. 6, may be used, whereby the direction of the guided light can be changed.

<Fourth Embodiment>

The present embodiment is a process for producing a polymer optical waveguide, which comprises the steps of:

preparing a mold by applying a mold-forming elastomer layer onto a surface of a master template having formed thereon a convex portion that corresponds to a core portion, peeling the layer from the master template to obtain a template, and cutting both ends of the template to expose a concave portion that corresponds to the convex portion of the master template;

bringing into close contact with a surface having the concave portion of the mold a cladding substrate which has good adhesiveness to the mold;

introducing, by capillarity, a curable resin which forms the core into the concave portion of the mold by contacting the curable resin with one or more resin input ports and/or resin input portions; and curing the introduced curable resin, wherein one through hole or multiple through holes arranged at regular intervals in a longitudinal direction of the core portion are opened to communicate from another surface opposite to the surface of the mold that is brought into close contact with the cladding substrate to the concave portion, thereby forming the one or more resin input ports or one or more resin output ports in order for both the cut ends of the mold to be used as resin input portions; and after the curable resin is introduced into the concave portion, a resin pushing member, in which a refractive index of a portion from a tip thereof to a portion thereof corresponding to a height of the convex portion is equal to that of the curable resin and a refractive index of other portions of the member is lower than that of the curable resin, is inserted into each of the one or more resin input ports and/or the one or more resin output ports so that the tip thereof is brought into close contact with the cladding substrate, to thereby perform the step of introducing the curable resin into the concave portion of the mold by capillarity.

The present embodiment is the same as the second embodiment except that the core portion is not made of only the curable resin introduced into the concave portion in the mold, but the core portion is composed of the curable resin and the tip of the inserted resin pushing member. In other words, the step of preparing a mold, the step of curing an introduced curable resin, and other procedures in the present embodiment are the same in the second embodiment, and only in the step of introducing the curable resin into a concave portion in the mold, a resin pushing member is inserted in such a manner that the tip of the resin pushing member is brought into close contact with a cladding substrate.

Specifically, when inserting the pin 7 into the hole 4 in the second embodiment, the following is used as the inserted pin 7: the same pin as described in the third embodiment, that is, a pin wherein the refractive index of the portion from its tip to the height corresponding portion of the convex portion 1*a* is equal to that of the curable resin 6 and the refractive index of other portions is lower than that of the curable resin 6. Furthermore, the pin 7 is inserted into the hole 4 (resin input port) in such a manner that the tip of the pin 7 is brought into close contact with the cladding substrate 5. Except these matters, the present embodiment is the same as the second embodiment.

As described in the respective embodiments, according to the invention, an optical waveguide that exhibits only a small loss and achieves a highly precise core shape can be formed at low costs in a simple manner, and a flexible polymer optical waveguide which is suitable for mass-production and has a high flexibility can be produced. In particular, about a polymer optical waveguide having a long optical waveguide length, the time for filling curable resin by capillarity can be shortened, whereby the producing efficiency can be improved.

Furthermore, more preferred embodiments of the invention will be described.

In a process for producing a polymer optical waveguide according to the first aspect of the invention, it is preferred that when there is an optical waveguide branched portion disposed in the longitudinal direction of the core, the one or more resin input ports or the one or more resin output ports are arranged at least at the branched portion.

In a process for producing a polymer optical waveguide according to the first aspect of the invention, it is preferred that the resin pushing member has a shape such that, when the member is inserted into the one or more resin input ports and/or the one or more resin output ports, the member becomes fixed at the depth obtained by subtracting the height of the convex portion from the thickness of the mold.

In a process for producing a polymer optical waveguide according to the first aspect of the invention, it is preferred that in addition to the convex portion that corresponds to the core portion, the master template has formed thereon convex portions that correspond to the one or more resin input ports and/or the one or more resin output ports, to thereby form the one or more resin input ports and/or the one ore more resin output ports at the same time that the mold is formed in the step of preparing the mold.

In a process for producing a polymer optical waveguide according to the first aspect of the invention, it is preferred that the material of at least the tip portion of the resin pushing member is the same as the mold-forming elastomer.

In a process for producing a polymer optical waveguide according to the first aspect of the invention, it is preferred that the resin pushing member has UV transparency.

In a process for producing a polymer optical waveguide according to the second aspect of the invention, it is preferred that when there is an optical waveguide branched portion disposed in the longitudinal direction of the core, the one or more resin input ports or the one or more resin output ports are arranged at least at the branched portion.

In a process for producing a polymer optical waveguide according to the second aspect of the invention, it is preferred that the resin pushing member has a shape such that, when the member is inserted into the one or more resin input ports and/or the one or more resin output ports, the member becomes fixed at the depth obtained by subtracting the height of the convex portion from the thickness of the mold.

In a process for producing a polymer optical waveguide according to the second aspect of the invention, it is preferred that in addition to the convex portion that corresponds to the core portion, the master template has formed thereon convex portions that correspond to the one or more resin input ports and/or the one or more resin output ports, to thereby form the one or more resin input ports and/or the one ore more resin output ports at the same time that the mold is formed in the step of preparing the mold.

In a process for producing a polymer optical waveguide according to the second aspect of the invention, it is preferred that the material of at least the tip portion of the resin pushing member is the same as the mold-forming elastomer.

In a process for producing a polymer optical waveguide according to the second aspect of the invention, it is preferred that the resin pushing member has UV transparency.

In a process for producing a polymer optical waveguide according to the third aspect of the invention, it is preferred that the resin pushing member functions as a reflecting mirror that is capable of changing a direction of signal light passing through the core of the optical waveguide.

In a process for producing a polymer optical waveguide according to the third aspect of the invention, it is preferred that the resin pushing member comprises a product obtained by curing the curable resin which is used to form the core at least at the portion from the tip thereof to the portion thereof corresponding to the height of the convex portion.

In a process for producing a polymer optical waveguide according to the fourth aspect of the invention, it is preferred that the resin pushing member functions as a reflecting mirror that is capable of changing a direction of signal light passing through the core of the optical waveguide.

In a process for producing a polymer optical waveguide according to the fourth aspect of the invention, it is preferred that the resin pushing member comprises a product obtained by curing the curable resin which is used to form the core at least at the portion from the tip thereof to the portion thereof corresponding to the height of the convex portion.

EXAMPLES

The present invention will be more specifically described hereinafter by way of the following examples, but the invention is not limited to these examples.

Example 1

A thick film resist (SU-8, manufactured by Microchemical Corp.) was disposed on a Si substrate (diameter: 6 inches) by spin-coating, pre-baked at 80° C., exposed through a photomask to light, and then subjected to development, so as to form a convex portion having a length of 12 cm. Then, the resultant product was post-baked at 120° C. to give a master template for forming a core portion of an optical waveguide, which had a convex portion possessing a section having an area of 50 μm squared and a length of 12 cm.

Normal hexane as a releasing agent was coated on this master template, and then a heat-curable polydimethylsiloxane (PDMS) elastomer (SYLGARD 184, manufactured by Dow Corning Asia Ltd.) was poured into the master template. The resultant product was cured by heating at 120° C. for 30 minutes, and then the cured elastomer was peeled to form a template which had a concave portion corresponding to the convex portion having the square section and had a thickness of 1 mm. This thickness was measured using a non-contact type laser displacement meter with a precision within 1 μm. Both ends of the template were cut using a cutter in such a manner that the concave portion was exposed, so as to form a resin output portion, whereby a mold was prepared. The surface energy of this mold was 20 mN/m, the Shore hardness Was 45°, and the root mean square roughness Rq was 0.05 μm.

Then, a hole having a diameter of 50 μm was opened at the center of an optical waveguide portion in such a manner that the hole communicated from another surface opposite to the surface, with which a cladding substrate would be brought into close contact, of the PDMS mold to the concave portion. This was used as a resin input port. This mold was brought into contact with an Arton film (manufactured by JSR Corp., thickness: 188 μm, refractive index: 1.51) which was vacuum-chucked on a flat glass and had a size larger than the mold, so that the both were brought into close contact with each other.

In this state, an epoxy-based UV-curable resin having a viscosity of 300 mPa·s (manufactured by NTT Advanced Technology Corporation) was dropped into the resin input port of the PDMS mold, thereby filling the UV-curable resin from the resin input port into the concave portion by capillarity. Within about three minutes, the UV-curable resin was filled into the concave portion entirely. After the filling was completed, a pin having a diameter of 50 μm was inserted into the resin input port to push out the resin that had been filled into the resin input port from the resin output portion. The material of the pin was a (UV transmissible) silicone resin and had the shape of a thumbtack. That is, its inserting portion was processed to have a length obtained by subtracting 50 μm from the thickness of the mold in compliance with the measured thickness of the corresponding PDMS mold. It was presumed that at this time the position-gap between the tip of the pin and the ceiling portion of the concave portion in the mold, which would constitute an optical waveguide, was 5 μm or less.

In this state, UV light having a light intensity of 50 mW/cm$^2$ was irradiated for 10 minutes through the PDMS mold onto the UV-curable resin so as to cure the resin. Next, the PDMS mold was removed to form a core portion, having the same shape as the convex portion of the master template, on the surface of the Arton film. The refractive index of the core portion was 1.54.

Furthermore, a UV-curable resin (manufactured by NTT Advanced Technology Corporation) having a refractive index of 1.51, which was the same as that of the Arton film, was coated onto the core-formed face of the Arton film. Thereafter, UV light having an intensity of 50 mW/cm$^2$ was irradiated to the resin for 10 minutes so as to cure the resin. As a result, a clad layer having a thickness of 50 μm was formed. In this manner, a flexible polymer optical waveguide was produced. The guided wave loss of this polymer optical waveguide was 0.35 dB/cm.

Example 2

A polymer optical waveguide was produced in the same manner as in Example 1 except that in order to fill the UV-curable resin into the concave portion of the mold, the resin output portion was brought into contact with the UV-curable resin so as to be converted to a resin input portion, and the resin input port was converted to a resin output port.

The time for filling the UV-curable resin into the entirety of the concave portion of the mold in this case was about 2 minutes. The guided wave loss of this polymer optical waveguide was 0.35 dB/cm.

Comparative Example 1

A polymer optical waveguide was produced in the same manner as in Example 1 except that the filling of the UV-curable resin, which was used to form the core, into the concave portion of the mold was performed by introducing the resin by capillarity from one of both the cut ends of the mold without opening any resin input port. In this case, it took about one hour to complete the filling of the UV-curable resin. The guided wave loss of this polymer optical waveguide was 0.33 dB/cm.

Example 3

A master template for forming a branched optical core portion that had a section having an area of 50 μm squared was formed in the same manner as in Example 1. The structure of this core was two-way type as illustrated in FIG. 3. The length of the core in front of the branched portion was 5 cm, and the length in rear of the branched portion was 7 cm. The width of the optical waveguide immediately before the branched portion was 80 μm.

The master template and PDMS elastomer were used to form a mold having a concave portion that had a section having an area of 50 μm squared and a thickness of 1.5 mm in the same manner as in Example 1. Next, both ends of the mold were cut in such a manner that the concave portion was exposed, so as to form a resin output portion. Next, a hole having a diameter of 80 μm was opened at an optical waveguide branched portion in such a manner that the hole communicated from another surface opposite to the surface, with which a cladding substrate would brought into close contact, of the PDMS mold to the concave portion. This was used as a resin input port. This mold was brought into contact with the same Arton film as used in Example 1, so that the two were brought into close contact with each other.

A heat-curable resin having a viscosity of 500 mPa·s (manufactured by NTT Advanced Technology Corporation) was dropped into the resin input port of the PDMS mold in this state, thereby filling the curable resin from the resin input port into the concave portion by capillarity. Within about five minutes, the heat-curable curable resin was filled into the entirety of the concave portion. After the filling was completed, a thumbtack-like pin having a tip diameter of 80 μm was inserted into the resin input port in the same manner as in Example 1 to push out the resin that had been filled into the resin input port from the resin output portion.

In this state, the heat-curable resin was cured by heating at 130° C. for 30 minutes. Then, the PDMS mold was removed to form a core portion, having the same shape as the convex portion of the master template, on the surface of the Arton film. The refractive index of the core portion was 1.54.

Furthermore, in the same manner as in Example 1, a clad layer was formed on the core-formed face of the Arton film. In this manner, a flexible polymer optical waveguide was produced. The guided wave loss of this polymer optical waveguide was 0.5 dB/cm.

Comparative Example 2

A polymer optical waveguide was produced in the same manner as in Example 2 except that the filling of the heat-curable resin, which was used to form the core, into the concave portion of the mold was performed by capillarity from one end of the mold in front of the branch, out of the cut ends of the mold, without opening any resin input port. In this case, it took about three hours to complete the filling of the heat-curable resin. The guided wave loss of this polymer optical waveguide was 0.45 dB/cm.

Example 4

A master template for forming core portions that had a section having an area of 50 μm squared was formed in the same manner as in Example 1. The structure of the core portions was four optical waveguides connected to 1×4 VCSELs. The length of the core portions was 12 cm. A plate made of SUS and having a thickness of 50 µm onto which a releasing agent was coated was fixed in order not to be inclined, at a position where the convex portions were divided substantially into two parts in the longitudinal direction, in such a manner that the plate crossed the convex portions corresponding to the four core portions. After the releasing agent was coated onto the entirety of the plate, the same PDMS elastomer as used in Example 1 was poured into the resultant product. Thereafter, the elastomer was cured by heating at 120° C. for 30 minutes. Then, the cured elastomer was peeled to form a template, which had a thickness of 3 mm and had a section having a concave portion corresponding to the square convex portion.

Next, the plate was removed to construct resin input ports in the PDMS mold. Furthermore, both ends of the mold were cut to construct resin output portions. In this way, a mold was formed. This mold and the same Arton film as described above, which was vacuum-chucked on a surface of a glass substrate, were brought into contact with each other so that the two were brought into close contact with each other.

In this state, a UV-curable resin was dropped into the resin input ports of the PDMS mold in the same manner as in Example 1, thereby filling the UV-curable resin from the resin input ports into the concave portions by capillarity. Within about two minutes, the UV-curable resin was filled into the entirety of the concave portions. After the filling was completed, a plate having a thickness of 50 µm and made of SUS was inserted into the resin input ports to push out the resin that had been filled into the resin input ports from the resin output portions. At this time, the depth of the inserted plate was specified to have a length obtained by subtracting 50 µm from the thickness of the mold, in compliance with the measured value of the thickness of the corresponding PDMS mold.

In this state, UV light having a light intensity of 50 mW/cm$^2$ was irradiated through the PDMS mold onto the UV-curable resin for 10 minutes so as to cure the resin. Next, the PDMS mold was removed to form core portions, having the same shape as the convex portions of the master template, on the surface of the Arton film. The refractive index of the core portion was 1.54.

Furthermore, a UV-curable resin (manufactured by JSR Corp.) having a refractive index of 1.51, which was the same as that of the Arton film, was coated onto the core-formed face of the Arton film. Thereafter, UV light having an intensity of 50 mW/cm$^2$ was irradiated onto the resin for 10 minutes so as to cure the resin. As a result, a clad layer having a thickness of 50 µm was formed. In this way, a flexible polymer optical waveguide was produced. The guided wave loss of this polymer optical waveguide was from 0.35 to 0.38 dB/cm.

Example 5

A master template for forming core portions that had a section having an area of 50 µm squared was formed in the same manner as in Example 1. The core structure was constructed for optical waveguides of a 32-channel bus. The length of the core portions was 30 cm. Five wedge-shaped plates made of SUS and having a tip thickness of 50 µm onto which a releasing agent was coated were prepared in such a manner that the plate crossed the convex portions corresponding to the 32 core portions. The plates were fixed to the convex portions at a pitch of 5 cm in the longitudinal direction in such a manner that the plates were not inclined. After the releasing agent was coated onto the entirety of the plates, the same PDMS elastomer as used in Example 1 was poured into the resultant product. Thereafter, the elastomer was cured by heating at 120° C. for 30 minutes. The cured elastomer was then peeled to form a template which had a thickness of 3 mm and had a section having a concave portion corresponding to the square convex portion.

Next, the plates were removed so as to construct resin input ports and resin output ports, all of which had the same shape, every other port in the PDMS mold. Furthermore, both ends of the template were cut to form resin output portions. In this manner, a mold was prepared. This mold and the same Arton film as described above, which was vacuum-chucked on a surface of a glass substrate, were brought into contact with each other so that the two were brought into close contact with each other.

In this state, an UV-curable resin was dropped into the resin input ports of the PDMS mold in the same manner as in Example 1, thereby filling the UV-curable resin from the resin input ports into the concave portions by capillarity. Within about three minutes, the UV-curable resin was filled into the entirety of the concave portion. After the filling was completed, a plate having a thickness of 50 µm and made of SUS was inserted into all of the resin input ports and the resin output ports to push out the resin that had been filled into the resin input ports from the resin output portions. At this time, a fixing member (not shown) was used to specify the depth of the inserted plate to a length obtained by subtracting 50 µm from the thickness of the mold, in compliance with the measured value of the thickness of the corresponding PDMS mold.

In this state, UV light having a light intensity of 50 mW/cm$^2$ was irradiated through the PDMS mold onto the UV-curable resin for 10 minutes so as to cure the resin. Next, the PDMS mold was removed to form the core portion, having the same shape as the convex portion of the master template, on the surface of the Arton film. The refractive index of the core portion was 1.54.

Furthermore, a UV-curable resin (manufactured by JSR Corp.) having a refractive index of 1.51, which was the same as that of the Arton film, was coated onto the core-formed face of the Arton film. Thereafter, UV light having an intensity of 50 mW/cm$^2$ was irradiated to the resin for 10 minutes so as to cure the resin. As a result, a clad layer having a thickness of 50 µm was formed. In this manner, a flexible polymer optical waveguide was produced. The guided wave loss of this polymer optical waveguide was from 0.38 to 0.42 dB/cm.

Example 6

A thick film resist (SU-8, manufactured by Microchemical Co., Ltd.) was disposed on a Si substrate (diameter: 6 inches) by spin-coating, pre-baked at 80° C., exposed through a photomask to light, and subjected to development, so as to form a convex portion having a length of 12 cm. Then, the resultant product was post-baked at 120° C. to give a master template for forming a core portion of an optical waveguide, which had a convex portion having a section that had an area of 50 µm squared and a length of 12 cm.

Normal hexane as a releasing agent was coated on this master template, and then a heat-curable polydimethylsiloxane (PDMS) elastomer (SYLGARD 184, manufactured by Dow Corning Asia Ltd.) was poured into the master template. The resultant product was cured by heating at 120° C. for 30 minutes, and then the cured elastomer was peeled to form a template which had a concave portion corresponding to the convex portion having the square section and had a thickness of 1.5 mm. Both ends of the template were punched out using a puncher in such a manner that the concave portion was exposed to form a resin output portion, whereby a mold was formed.

Then, a hole having a diameter of 50 µm was opened at the center of an optical waveguide portion in such a manner that the hole was continuous from another surface opposite to the surface, with which a cladding substrate would brought into close contact, of the PDMS mold to the concave portion. This was used as a resin input port. This mold was brought into contact with an Arton film (manufactured by JSR Corp., thickness: 188 µm, refractive index: 1.51) which was vacuum-chucked on a flat glass and had a size larger than the mold, so that the two were brought into close contact with each other.

In this state, an epoxy-based UV-curable resin having a viscosity of 500 mPa·s (manufactured by NTT Advanced Technology Corporation) was dropped into the resin input port of the PDMS mold, thereby filling the UV-curable resin from the resin input port into the concave portion by capillarity. Within about four minutes, the UV-curable resin was filled into the entirety of the concave portion. After the filling was completed, a pin which had a fine cylindrical shape having a diameter of 50 µm and a length of 50 µm and was made of a cured core UV-curable resin was inserted into the resin input port to push out the resin that had been filled into the resin input port from the resin output portion. This pin was poked onto the bottom (cladding substrate) of the resin input port. In this manner, the pin itself constituted a part of the core formed.

In this state, UV light having a light intensity of 50 mW/cm$^2$ was irradiated through the PDMS mold onto the UV-curable resin for 10 minutes so as to cure the resin. Next, the PDMS mold was removed to form a core portion, having the same shape as the convex portion of the master template, on the surface of the Arton film. The refractive index of the core portion was 1.54.

Furthermore, an UV-curable resin (manufactured by NTT Advanced Technology Corporation) having a refractive index of 1.51, which was the same as that of the Arton film, was applied to the core-formed face of the Arton film. Thereafter, UV light having an intensity of 50 mW/cm$^2$ was irradiated to the resin for 10 minutes so as to cure the resin. As a result, a clad layer having a thickness of 50 µm was formed. In this manner, a flexible polymer optical waveguide was produced. The guided wave loss of this polymer optical waveguide was 0.35 dB/cm.

Example 7

A polymer optical waveguide was produced in the same manner as in Example 6 except that in order to fill the UV-curable resin into the concave portion of the mold, the resin output port was brought into contact with the UV-curable resin so as to be converted to a resin input port, and the resin input port was converted to a resin output port.

The time for filling the UV-curable resin into the entirety of the concave portion of the mold in this case was about 4 minutes. The guided wave loss of this polymer optical waveguide was 0.35 dB/cm.

Example 8

A polymer optical waveguide was produced in the same manner as in Example 6 except that the inserted pin was changed to another pin which had a cylindrical shape having 1 mm in length and 50 µm in diameter and had a structure in which a half mirror was arranged inside its tip. As illustrated in the sectional view of FIG. 6, in this polymer optical waveguide, the optical waveguide 15 was formed, which had a branched portion toward the side opposite to the cladding substrate 5 at the position of the pin 14 in the middle of the optical waveguide advancing direction. The guided wave loss of this polymer optical waveguide was about 5 dB/cm.

According to the process for producing a polymer optical waveguide of the invention, the optical waveguide that exhibits a reduced guided wave loss and achieves a highly precise core shape can be formed at low costs in a simple manner. Also the flexible polymer optical waveguide which is suitable for mass-production and has a high flexibility can be produced, which provides advantages in that the time for filling the curable resin by capillarity can be shortened and the producing efficiency can be improved even when the polymer optical waveguide has a long optical waveguide length.

What is claimed is:

1. A process for producing a polymer optical waveguide, comprising the steps of:
    preparing a mold by applying a mold-forming elastomer layer onto a surface of a master template having formed thereon a convex portion that corresponds to a core portion, peeling the layer from the master template to obtain a template, and cutting both ends of the template to expose a concave portion that corresponds to the convex portion of the master template;
    bringing into close contact with a surface having the concave portion of the mold a cladding substrate which has good adhesiveness to the mold;
    introducing, by capillarity, a curable resin which forms the core into the concave portion of the mold by contacting the curable resin with one or more resin input ports; and
    curing the introduced curable resin,
    wherein one through hole or multiple through holes arranged at regular intervals in a longitudinal direction of the core portion are opened to communicate from another surface opposite to the surface of the mold that is brought into close contact with the cladding substrate to the concave portion, thereby forming the one or more resin input ports or one or more resin output ports in order for both the cut ends of the mold to be used as resin output portions; and after the curable resin is introduced into the concave portion, a resin pushing member is inserted into each of the one or more resin input ports and/or the one or more resin output ports to a depth obtained by subtracting a height of the convex portion from a thickness of the mold, to thereby perform the step of introducing the curable resin into the concave portion of the mold by capillarity.

2. The process for producing a polymer optical waveguide according to claim 1, wherein when there is an optical waveguide branched portion disposed in the longitudinal direction of the core, the one or more resin input ports or the one or more resin output ports are arranged at least at the branched portion.

3. The process for producing a polymer optical waveguide according to claim 1, wherein the resin pushing member has a shape such that, when the member is inserted into the one or more resin input ports and/or the one or more resin output ports, the member becomes fixed at the depth obtained by subtracting the height of the convex portion from the thickness of the mold.

4. The process for producing a polymer optical waveguide according to claim 1, wherein, in addition to the convex portion that corresponds to the core portion, the master template has formed thereon convex portions that correspond to the one or more resin input ports and/or the one or more resin output ports, to thereby form the one or more resin input ports and/or the one ore more resin output ports at the same time that the mold is formed in the step of preparing the mold.

5. The process for producing a polymer optical waveguide according to claim 1, wherein at least a tip portion of the resin pushing member comprises a material that is the same as the mold-forming elastomer.

6. The process for producing a polymer optical waveguide according to claim 1, wherein the resin pushing member has UV transparency.

7. A process for producing a polymer optical waveguide, comprising the steps of:
preparing a mold by applying a mold-forming elastomer layer onto a surface of a master template having formed thereon a convex portion that corresponds to a core portion, peeling the layer from the master template to obtain a template, and cutting both ends of the template to expose a concave portion that corresponds to the convex portion of the master template;
bringing into close contact with a surface having the concave portion of the mold a cladding substrate which has good adhesiveness to the mold;
introducing, by capillarity, a curable resin which forms the core into the concave portion of the mold by contacting the curable resin with one or more resin input ports and/or resin input portions; and
curing the introduced curable resin,
wherein one through hole or multiple through holes arranged at regular intervals in a longitudinal direction of the core portion are opened to communicate from another surface opposite to the surface of the mold that is brought into close contact with the cladding substrate to the concave portion, thereby forming the one or more resin input ports or one or more resin output ports in order for both the cut ends of the mold to be used as resin input portions; and after the curable resin is introduced into the concave portion, a resin pushing member is inserted into each of the one or more resin input ports and/or the one or more resin output ports to a depth obtained by subtracting a height of the convex portion from a thickness of the mold, to thereby perform the step of introducing the curable resin into the concave portion of the mold by capillarity.

8. The process for producing a polymer optical waveguide according to claim 7, wherein when there is an optical waveguide branched portion disposed in the longitudinal direction of the core, the one or more resin input ports or the one or more resin output ports are arranged at least at the branched portion.

9. The process for producing a polymer optical waveguide according to claim 7, wherein the resin pushing member has a shape such that, when the member is inserted into the one or more resin input ports and/or the one or more resin output ports, the member becomes fixed at the depth obtained by subtracting the height of the convex portion from the thickness of the mold.

10. The process for producing a polymer optical waveguide according to claim 7, wherein, in addition to the convex portion that corresponds to the core portion, the master template has formed thereon convex portions that correspond to the one or more resin input ports and/or the one or more resin output ports, to thereby form the one or more resin input ports and/or the one ore more resin output ports at the same time that the mold is formed in the step of preparing the mold.

11. The process for producing a polymer optical waveguide according to claim 7, wherein at least a tip portion of the resin pushing member comprises a material that is the same as the mold-forming elastomer.

12. The process for producing a polymer optical waveguide according to claim 7, wherein the resin pushing member has UV transparency.

13. A process for producing a polymer optical waveguide, comprising the steps of:
preparing a mold by applying a mold-forming elastomer layer onto a surface of a master template having formed thereon a convex portion that corresponds to a core portion, peeling the layer from the master template to obtain a template, and cutting both ends of the template to expose a concave portion that corresponds to the convex portion of the master template;
bringing into close contact with a surface having the concave portion of the mold a cladding substrate which has good adhesiveness to the mold;
introducing, by capillarity, a curable resin which forms the core into the concave portion of the mold by contacting the curable resin with one or more resin input ports; and
curing the introduced curable resin,
wherein one through hole or multiple through holes arranged at regular intervals in a longitudinal direction of the core portion are opened to communicate from another surface opposite to the surface of the mold that is brought into close contact with the cladding substrate to the concave portion, thereby forming the one or more resin input ports or one or more resin output ports in order for both the cut ends of the mold to be used as resin output portions; and after the curable resin is introduced into the concave portion, a resin pushing member, in which a refractive index of a portion from a tip thereof to a portion thereof corresponding to a height of the convex portion is equal to that of the curable resin and a refractive index of other portions of the member is lower than that of the curable resin, is inserted into each of the one or more resin input ports and/or the one or more resin output ports so that the tip thereof is brought into close contact with the cladding substrate, to thereby perform the step of introducing the curable resin into the concave portion of the mold by capillarity.

14. The process for producing a polymer optical waveguide according to claim 13, wherein the resin pushing member functions as a reflecting mirror that is capable of changing a direction of signal light passing through the core of the optical waveguide.

15. The process for producing a polymer optical waveguide according to claim 13, wherein the resin pushing member comprises a product obtained by curing the curable resin which is used to form the core at least at the portion from the tip thereof to the portion thereof corresponding to the height of the convex portion.

16. A process for producing a polymer optical waveguide, comprising the steps of:
preparing a mold by applying a mold-forming elastomer layer onto a surface of a master template having formed thereon a convex portion that corresponds to a core portion, peeling the layer from the master template to obtain a template, and cutting both ends of the template to expose a concave portion that corresponds to the convex portion of the master template;

bringing into close contact with a surface having the concave portion of the mold a cladding substrate which has good adhesiveness to the mold;

introducing, by capillarity, a curable resin which forms the core into the concave portion of the mold by contacting the curable resin with one or more resin input ports and/or resin input portions; and curing the introduced curable resin, wherein one through hole or multiple through holes arranged at regular intervals in a longitudinal direction of the core portion are opened to communicate from another surface opposite to the surface of the mold that is brought into close contact with the cladding substrate to the concave portion, thereby forming the one or more resin input ports or one or more resin output ports in order for both the cut ends of the mold to be used as resin input portions; and after the curable resin is introduced into the concave portion, a resin pushing member, in which a refractive index of a portion from a tip thereof to a portion thereof corresponding to a height of the convex portion is equal to that of the curable resin and a refractive index of other portions of the member is lower than that of the curable resin, is inserted into each of the one or more resin input ports and/or the one or more resin output ports so that the tip thereof is brought into close contact with the cladding substrate, to thereby perform the step of introducing the curable resin into the concave portion of the mold by capillarity.

17. The process for producing a polymer optical waveguide according to claim 16, wherein the resin pushing member functions as a reflecting mirror that is capable of changing a direction of signal light passing through the core of the optical waveguide.

18. The process for producing a polymer optical waveguide according to claim 16, wherein the resin pushing member comprises a product obtained by curing the curable resin which is used to form the core at least at the portion from the tip thereof to the portion thereof corresponding to the height of the convex portion.

* * * * *